Patented Aug. 19, 1941

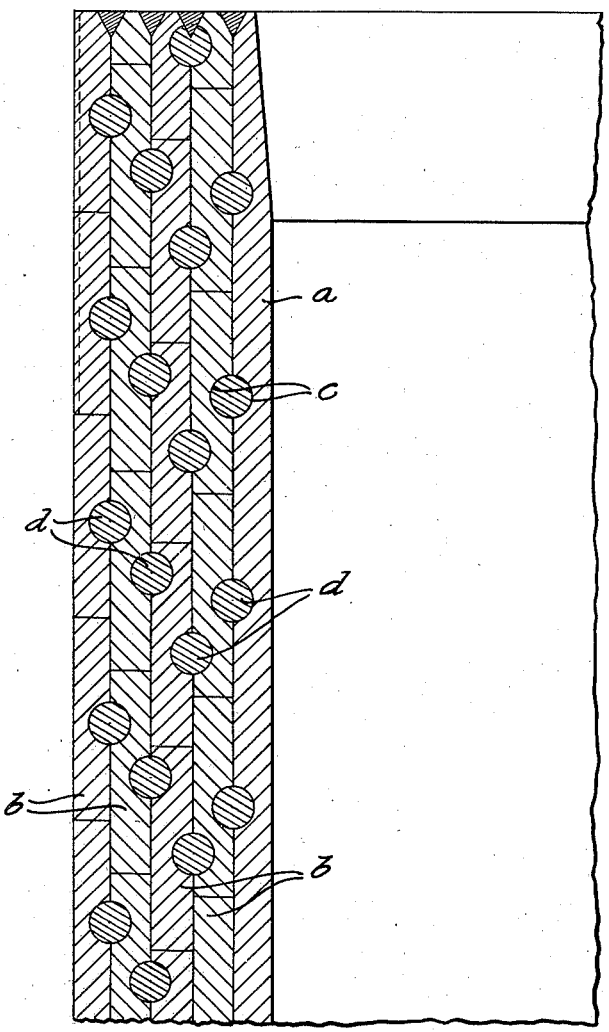

2,253,093

UNITED STATES PATENT OFFICE 2,253,093

HIGH-PRESSURE VESSEL

Ludwig Raichle and Karl Riedinger, Ludwigshafen-on-the-Rhine, Germany, assignors, by mesne assignments, to William E. Currie, New York, N. Y.

Application June 2, 1939, Serial No. 277,032
In Germany June 4, 1938

5 Claims. (Cl. 220—3)

The present invention relates to high-pressure vessels.

Generally speaking high pressure vessels, such as are frequently used for example for the synthesis of ammonia or the destructive hydrogenation of coals, tars, mineral oils or other high pressure processes, are prepared by forging a cast block. This method of working requires long preparation times, large amounts of material and expensive devices, because such pressure vessels often have a weight of up to several tons.

We have now found that pressure vessels which will withstand high and very high pressures can be obtained without great consumption of material by constructing the pressure-bearing walls of two or more layers of metal band wound on helically without intermediate spaces and arranging on the inner and outer sides of this band in the longitudinal direction groove-like depressions in such manner that the depression on the outside of one metal band coincides with the depression on the inside of the metal band lying thereon, the hollow space thus formed being provided with a metal body, as for example a wire. The groove-like depressions, of which one or more may be present on one band, preferably run parallel to the edges.

For vessels which are to be used at high pressures, as for example of more than 100 atmospheres, it is advantageous to arrange a large number of layers of the said wound bands one on another, the edges of the superposed bands preferably running in different directions, as for example cross-wise. The bands may be welded together at their edges. Up to ten or more layers may be superposed, depending on the purpose for which the vessel is to be used. It is also advantageous, in cases in which the walls of the pressure vessel should have good thermal conductivity, to arrange thin layers of plastic or readily fusible metals or metal alloys between the single layers.

It is advantageous to make the pressure vessel by helically winding the metal band onto a tube which is to serve, for example, as the inner lining of the high pressure vessel. One of the flat surfaces of the first layer of helically wound metal bands is in contact with the tube. It is, of course, also possible to wind the metal band about a mandrel which is later removed, preferably by heating.

It is of special advantage to apply the second and subsequent layers of metal bands at such high temperature that their shrinkage, upon cooling, will set up stresses in the walls of the pressure vessel when it is not in use. This internal stress will increase the ability of the vessel to withstand high internal pressure during operation.

One of the most desirable methods of manufacturing a pressure vessel in accordance with applicants' invention, is to first wind a band having one smooth surface and one surface with a longitudinal depression helically about a tube or mandrel so that the smooth surface of the band is in contact with said tube or mandrel. A metal body as, for example, a wire is then wound over the band, preferably while hot, in such a manner that approximately one-half of its cross-section is in the depression. Thereupon another metal band having a depression similar to that of the first metal band is wound over the unit so that the part of the metal body projecting from the first band is lodged in the depression of the second band. It is, of course, feasible to apply several layers of metal bands with metal bodies interposed between them.

The accompanying figure of drawing is a cross-section through the wall of a typical high pressure vessel built in accordance with this invention. Referring to this drawing it will be noted that $a$ is the lining tube on which a metal band $b$ is wound helically. The metal bands have grooves $c$ in intermediate positions on the outer and inner sides. In the outermost layer, the grooves on the outer side are omitted, and the grooves on the inner side of the lining tube are also omitted. $d$ is the wire which is laid in the grooves and drawn up tightly.

What we claim is:

1. A high-pressure vessel the pressure-bearing wall of which comprises at least two layers of metal band wound helically with the band edges meeting each other, said metal bands being provided on their inner and outer sides in their longitudinal direction with groove-like depressions and being arranged so that the depression on the inner side of a superposed metal band comes to lie on the depression on the outer side of the lower metal band, said depressions thus forming a hollow space, and a metal body filling said hollow space.

2. A high-pressure vessel as claimed in claim 1 wherein the metal body is a wire which fills up the hollow space completely.

3. A high-pressure vessel as claimed in claim 1 wherein said layers of metal band are wound on an inner tube having groove-like depressions in its outer wall.

4. A high-pressure vessel as claimed in claim 1 wherein the outermost layer of metal band has groove-like depressions on its inner side only.

5. A high-pressure vessel as claimed in claim 1 wherein said layers of metal band are wound on an inner tube having groove-like depressions in its outer wall, the outermost layer of metal band has groove-like depressions on its inner side only and said metal body is a wire which fills up the hollow space completely.

LUDWIG RAICHLE.
KARL RIEDINGER.